United States Patent [19]

Sternenberg et al.

[11] Patent Number: 5,525,047
[45] Date of Patent: Jun. 11, 1996

[54] SEALING SYSTEM FOR AN UNLOADER

[75] Inventors: James E. Sternenberg, Houston; Richard E. Shaw, Kingwood, both of Tex.

[73] Assignee: Cooper Cameron Corporation, Houston, Tex.

[21] Appl. No.: 267,994

[22] Filed: Jun. 29, 1994

Related U.S. Application Data

[63] Continuation-in-part of Ser. No. 85,567, Jun. 30, 1993, abandoned.
[51] Int. Cl.$^6$ ................................................ F04B 49/02
[52] U.S. Cl. .................. 417/307; 251/335.2; 251/282; 277/165
[58] Field of Search .................. 417/307; 251/335.3, 251/282, 62; 92/34, 44, 47; 277/165; 137/312

[56] References Cited

U.S. PATENT DOCUMENTS

| | | | |
|---|---|---|---|
| 3,895,651 | 7/1975 | Okada et al. | 251/335.1 |
| 5,017,099 | 5/1991 | Tan | 417/307 |

FOREIGN PATENT DOCUMENTS

| | | | |
|---|---|---|---|
| 322406 | 6/1989 | European Pat. Off. | |

OTHER PUBLICATIONS

EG&G Sealol Eagle, "Eagle Bellows Seal Valves," Bulletin 2200 (11 pgs.).

*Primary Examiner*—Charles Freay
*Attorney, Agent, or Firm*—Conley, Rose & Tayon

[57] ABSTRACT

A sealing system for a plug-type unloader includes a bonnet having a guide bore with a stem reciprocably mounted within the guide bore. One end of the stem is affixed to a plug and the other end of the stem is connected to an actuator. A bellows member is positioned around the stem within the plug. The bellows member includes an expandable and contractible bellows having one end attached to the bonnet and the other end attached to the stem. Static seals are provided between one end of the bellows and the bonnet and the other end of the bellows and the stem. The bellows between the ends allows the bellows member to expand and contract as the stem reciprocates within the unloader. No dynamic seals are required. The plug of an unbalanced unloader includes a bore slidingly receiving an adapter around the bellows member to protect the bellows member from the pressure pulsations around the plug.

19 Claims, 6 Drawing Sheets

SEALING SYSTEM FOR AN UNLOADER

RELATED APPLICATION

This application is a continuation-in-part of U.S. patent application Ser. No. 08/085,567 filed Jun. 30, 1993, now abandoned.

BACKGROUND OF THE INVENTION

This invention relates to unloaders for reciprocating compressors and more particularly to seals for sealing the stem of a compressor unloader.

Unloaders are used in conjunction with a reciprocating compressor to prevent the compressor cylinder pressure from increasing or to limit the magnitude of cylinder pressure increase during the compression stroke of the compressor piston in the compressor cylinder. When the unloader is in the closed position, the compressor functions as a conventional compressor. In this condition, it is operating in the normal or "loads" condition where the compressor cylinder pressure increases during the compression stroke of the compressor piston in the compressor cylinder. When the unloader is in the on position, the compressor cylinder gas is allowed to move to an adjacent chamber and bypass the compression cycle. When operating in this condition, the compressor is referred to as "unloads".

Unloaders provide operational flexibility in controlling compressor capacity. They can also be used to maintain operating pressures, temperatures, driver horsepower loads and piston rod loads within acceptable limits as operating conditions change. During start-up, they can reduce the load on the driver by the compressor cylinder so that available energy can be used to overcome rotational inertia, rather than for compression.

There are various types of unloaders such as plug unloaders which can be used with bypass or volume bottle unloader assemblies. Plug unloaders may be of the balanced or unbalanced type.

Plug unloaders are used with a suction unloader valve to deactivate the cylinder end; with either a suction or discharge unloader valve and volume bottle to add fixed clearance; or as a head end pocket unloader to add fixed clearance. The balanced plug unloader is designed to use the energy of the compressed gas to assist actuation. This minimizes the force required to load, allowing low pressure plant air to be used for actuation.

The plug style unloader uses a pneumatically actuated plug assembly to open and close a center port of a specially designed pressure valve. Air supply, provided through either a remote or integral control valve, acts inside a piston and cylinder chamber to deliver a smooth, positive force to the stem and plug assembly. The balanced plug design uses a stem/plug assembly that moves along a fixed bonnet guide. Drilled holes in the base of the plug allow the gas pressure to remain below (balanced) the plug seat and between the bonnet guide and plug (balanced) as the plug opens and closes. Actuator forces are therefore reduced so smaller, less costly actuator designs can be used.

When the plug is in the closed position, the unloader valve functions as a conventional compressor valve; however, when the plug is in the open position, compressor cylinder gas is allowed to move to the adjacent suction or discharge compression chamber and bypass the compression cycle.

When used with a volume bottle and in the open position, compressor cylinder gas expands inside a fixed clearance bottle during each compression stroke. When used as a head end unloader, the result is similar. In this case, the plug opens and closes an integral cavity of the compressor cylinder end.

Unbalanced (solid plug) unloaders operate similarly to that of the balanced unloaders except that the plug is solid and does not include drilled holes in the base of the plug as does the balanced unloader. Thus, actuator forces are greater than that of the balanced unloader since the gas pressure is fully applied to the plug and not allowed to pass through the holes in the plug as in the balanced unloader.

The various types of unloaders include a reciprocating stem passing through a bonnet and having one end affixed to the plug. The stem reciprocates within the bonnet as the plug moves between the loaded and unloaded positions of the unloader. Thus, dynamic seals must be provided to seal between the reciprocating stem and bonnet. Various types of unloader stem dynamic seals have been used including elastomeric, polymeric, or a combination of elastomeric-polymeric seals which are both pressure energized and mechanically energized.

The leakage of environmentally unsafe gasses into the atmosphere is of great concern to the process industry. In particular, fugitive emissions of process gasses may escape into the atmosphere through leaks in reciprocating compressors. If a major leak occurs, the plant may have to be shut down until the leakage is corrected.

The EPA requirements for these dynamic stem seals are rigorous and do not allow emissions around the unloader stem. Prior art compressor valve unloaders leak process gas to the atmosphere past the unloader stem dynamic seal or seals. This leakage can be a major problem when the process gas is toxic or hazardous.

The present invention overcomes the deficiencies of prior art dynamic seals for unloader stems.

SUMMARY OF THE INVENTION

The unloader of the present invention includes a bonnet mounted adjacent a cylinder on a reciprocating compressor. In a plug-type unloader, an adapter is mounted to one end of the bonnet and includes a plug reciprocably mounted over the adapter. A stem extends through a bore in the bonnet and has one end attached to the plug. The other end of the stem is connected to an actuator.

A bellows member seals the stem with the bonnet. The bellows member includes an expandable and contractible bellows having one end fitting which is attached to the bonnet and another end fitting which is attached to the stem. The bellows between the end fittings allows the bellows member to expand and contract as the stem reciprocates within the unloader bonnet. Static seals are provided between the end fitting and the bonnet and the other end fitting and the stem. No dynamic seals are required, i.e., seals between moving surfaces.

The unbalanced unloader includes a plug having a cylindrical skirt slidingly receiving the adapter to protect the bellows member from the pressure pulsations in the chamber around the plug.

Other objects and advantages of the present invention will appear from the following description.

BRIEF DESCRIPTION OF THE DRAWINGS

For a detailed description of a preferred embodiment of the invention, reference will now be made to the accompanying drawings wherein.

DESCRIPTION OF A PREFERRED EMBODIMENT

Figures 1, 2A:
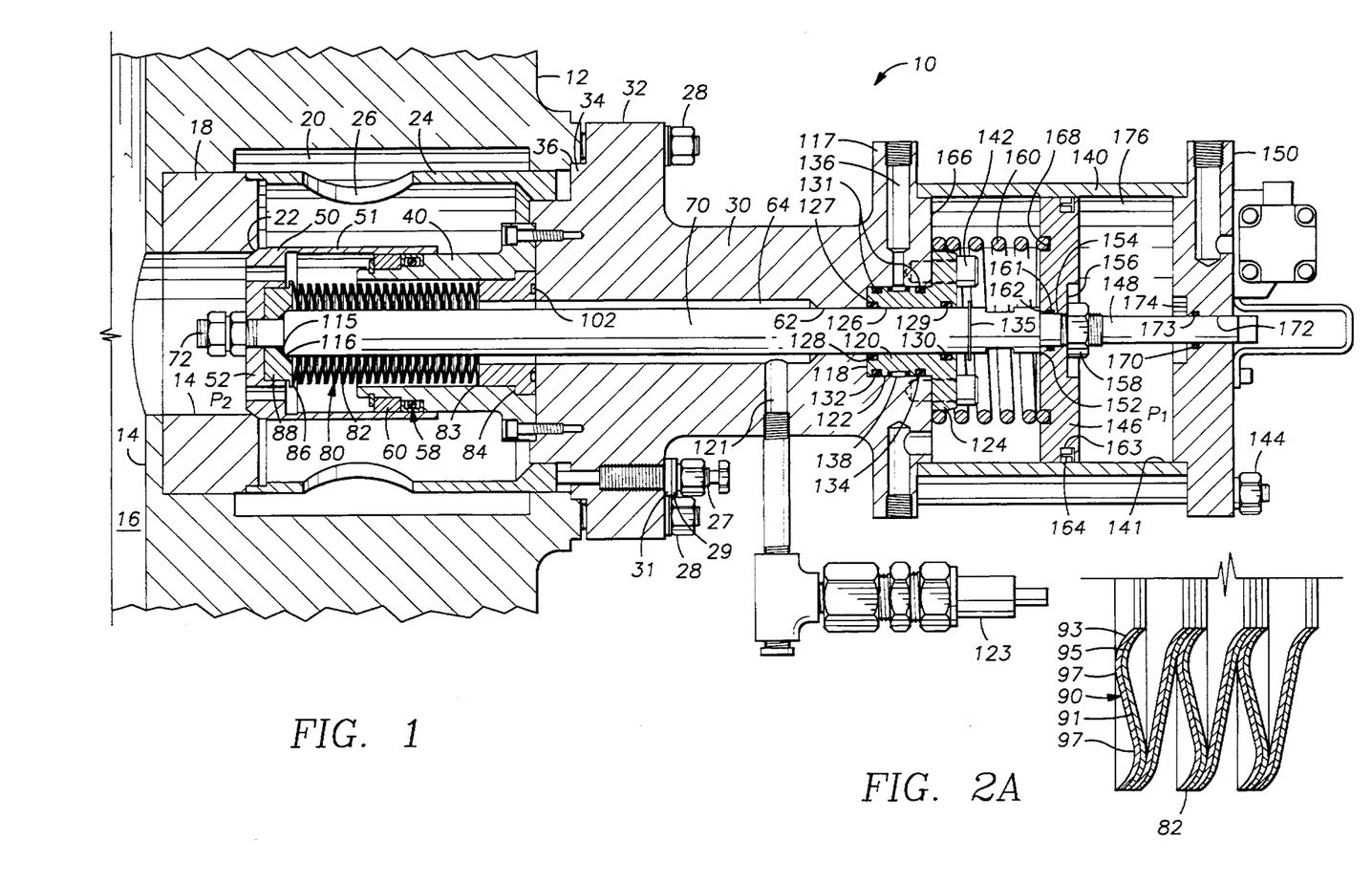
FIG. 1 is a cross-sectional side elevational view of a balanced unloader in the loaded position.
FIG. 2A is an enlargement of a cross section of the convolutions of the bellows member.

Referring initially to FIG. 1, there is shown a balanced plug-type valve unloader 10 mounted on a reciprocating compressor 12. The unloader 10 is mounted adjacent one of the cylinders 14 of reciprocating compressor 12. Cylinder 14 forms a compression chamber 16. A generally cylindrical chamber 20 is disposed above cylinder 14 and compression chamber 16 within reciprocating compressor 12. A portion of unloader 10 is received within chamber 20 of reciprocating compressor 12.

A valve 18 is mounted on cylinder 14 and includes a conical seat 22. A cage 24 having side apertures 26 is disposed within chamber 20 at a reduced diameter on the outer periphery of valve 18. Unloader 10 further includes a bonnet 30 having a first flange 32 attached to reciprocating compressor 12 by fasteners 28 and a first annular portion 34 disposed within a counterbore 36 in compressor 12. Jack bolts 27 threadingly extend through tapped bores in first flange 32 for placing a load on cage 24 to hold cage 24 and thus valve 18 firmly in place. Jack bolts 27 also include a pair of washers 29, 31 to prevent process gas from passing through the tapped bore in flange 32 and into the atmosphere. Metal washer 31 includes a rubber seal for sealingly engaging flange 32.

Figure 2:
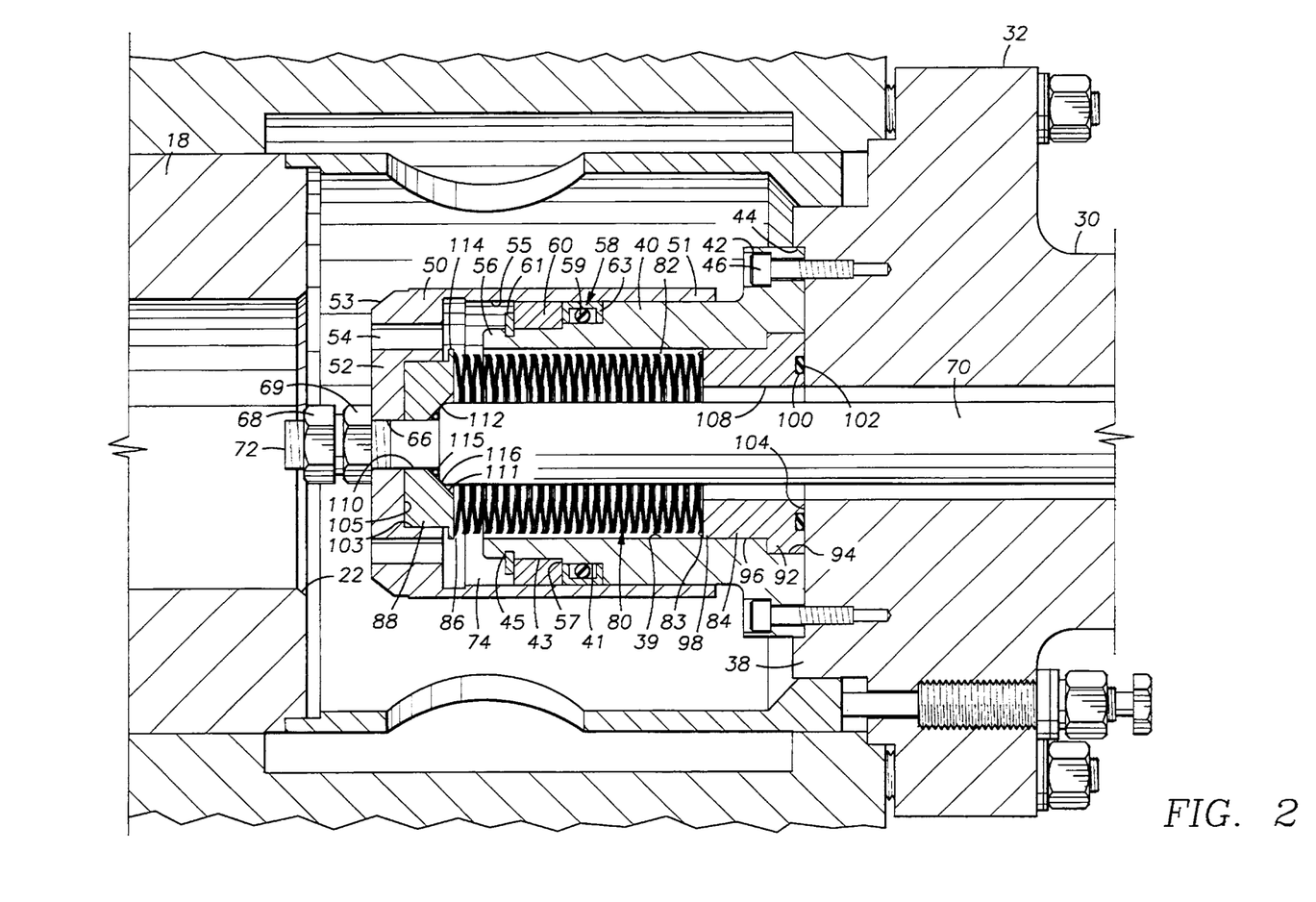
FIG. 2 is an enlarged cross-sectional side elevational view of the bellows member of the balanced unloader of FIG. 1 in the unloaded position.

Referring now to FIGS. 1 and 2, unloader 10 further includes a plug 50 reciprocably mounted on a retainer-plug seal adapter 40. Adapter 40 includes a base flange 42 received within a central counterbore 44 in a second annular portion 38 of bonnet 30 and is affixed thereto by fasteners 46. Plug 50 has a generally cylindrical body 51 with a base 52. Since in this embodiment the unloader is of the balanced type, holes 54 are drilled through the base 52 of plug 50 to allow the passage of process gas from compression chamber 16. The cylindrical body 51 of plug 50 receives the free end 56 of retainer-plug seal adapter 40. Plug 50 includes a sealing face 53 which sealingly engages valve seat 22 in the loaded position.

A metal-to-metal sealing engagement is established between valve seat 22 and plug 50 to maintain compression in chamber 16 in the loaded position. A small leakage around seat 22 into chamber 20 does not cause an environmental problem since process gas is exhausted into chamber 20 when the unloader is in the unloaded position.

A dynamic sealing assembly is mounted on retainer-plug seal adapter 40 for sealingly engaging the inner annular wall 55 of the cylindrical body 51 of plug 50. The sealing assembly includes a seal 58, bearing ring 60, and retaining ring 61. Retainer 40 includes a reduced diameter portion 41 for housing seal 58 and a further reduced diameter portion 43 for housing bearing ring 60. A retaining ring groove 45 is provided for receiving retaining ring 61. The preferred embodiment of seal 58 includes an elastomeric O-ring 59 mounted within a channel cross-sectioned ring 63 and is referred to as a "slipper" seal. The ring 63 is made of Teflon™ which provides a low friction surface against the reciprocating annular wall 55 of plug 50. This low friction surface provides very little resistance to the reciprocating motion of plug 50. The elastomeric O-ring 59 sealingly engages the inner surface of ring 63 and reduced diameter portion 41 of retainer 40. The elastomeric O-ring 59 is compressed so as to provide a mechanical seal engagement with adapter 40 and channel ring 63. Elastomeric O-ring 59 is also pressure energized such that the pressure differential across seal 58 further energizes the sealing engagement of elastomeric O-ring 59 within retainer 40 and channel ring 63.

Bearing ring 60 is received in reduced diameter portion 43 and bears against the shoulder 57 created by the difference in diameters between reduced diameter portions 41, 43 and is maintained in position by retaining ring 61. Bearing ring 60 maintains seal 58 in position in reduced diameter portion 41. Bearing ring 60 is made of a bearing material and provides an annular bearing surface against the inner annular wall 55 of the cylindrical body 51 of plug 50. The cylindrical body 51 engages the outer bearing surface of bearing ring 60. This engagement prevents plug 50 from placing a load on seal 58.

Bonnet 30 also includes an axial clearance bore 62 therethrough having an enlarged diameter portion 64 forming a pressure annulus for monitoring the pressure within bellows 80 hereinafter described. A shaft or stem 70 extends through clearance bore 62 of bonnet 30 and has a threaded reduced diameter inner end 72 passing through an aperture 66 in the base or closed end 52 of plug 50. The transition of stem 70 to reduced diameter inner end 72 forms a radius 112.

Threaded fasteners 68, 69 affix plug 50 to the inner end 72 of stem 70. Fasteners 68, 69 include an inner locking nut 69 having a plurality of extending arcuate fingers (not shown) which are compressed inwardly as the outer nut 68 is threaded over inner nut 69. The arcuate fingers lock the two nuts 68, 69 in place on the end 72 of stem 70. Nuts 68, 69 are reusable.

Unloader 10 further includes a bellows member 80 having an expandable and contractible means 82 with static seals on end fittings 84, 88 for sealingly engaging stem 70 and bonnet 30. The preferred means 82 is a metal bellows mounted within the cylindrical cavity 74 formed by plug 50 and adapter 40. One end 83 of metal bellows 82 is attached, such as by welding or brazing, to a retainer end fitting 84 and another end 86 of bellows 82 is affixed, such as by welding or brazing, to a plug end fitting 88.

Referring now to FIGS. 2 and 2A, metal bellows 82 includes a plurality of convolutions 90 allowing it to longitudinally expand and contract with ends 83, 86 being fixed. Bellows 82 is preferably a welded bellows rather than a formed bellows. Formed bellows are made by mechanically rolling or hydraulically forming convolutions into a thin-wall, seamless tube. However, it is preferred that metal bellows 82 be a welded bellows. Convolutions 90 are generated from washer-shaped stampings 91, called diaphragms, circumferentially welded together at the inside and outside edge. This construction enables the welded bellows to collapse completely to solid height, where it can withstand over pressures in excess of operating pressure. The span from inside to outside can also be relatively large. This allows for very low spring rates and a longer stroke for a given size. For equal performance, a welded bellows is more compact than a formed bellows.

Bellows 82 is preferably made of a metal such as Inconel™ 625 manufactured by INCO Alloys International. Inconel is a nickel-chromium alloy with excellent corrosion resistance and a very wide temperature tolerance. Inconel 625 additionally includes molybdenum and columbium which increase its annealed yield strength. Inconel 625 has excellent weldability. The diaphragms 91 of bellows 82 may have one to three or more plys. Diaphragm 91 is preferably two-ply in that two washer-shaped stampings 93, 95 form each individual diaphragm 91. Also, it is preferred that the diaphragm have a nesting ripple to provide good resistance to external pressure and to provide a long stroke and low spring rate. It is preferred that the diaphragm of the present invention include two or three ripples 97.

The objective of bellows member 80 is to provide an expandable and contractible means 82 between static seals to eliminate dynamic seals between moving surfaces i.e., between bonnet 30 and stem 70 as stem 70 reciprocates within clearance bore 62 of bonnet 30. Although the expandable and contractible means 82 is preferably a metal bellows. A rolling diaphragm might also be used in certain environments. A rolling diaphragm is typically a cloth material impregnated with an elastomeric material. The rolling diaphragm is in the form of a conical boot having a lower rubber flange and a flat top. The top is rolled interiorly of the larger conical bottom and pushed downwardly with the top being affixed to one member and the bottom affixed to the other member. The diaphragm rolls as one member moves with respect to the other member. Rolling diaphragms have the advantage of a longer travel so that the moving member can have a long stroke. The principal disadvantages of an elastomeric rolling diaphragm is that the diaphragm provides no lateral support and thus cannot withstand substantial pressure differentials. One modification would be to enclose the rolling diaphragm around a metal support to allow the diaphragm to provide lateral stability. Also, elastomeric material cannot be subjected to high temperatures. Thus, rolling diaphragms have limitations.

Since bellows 82 is made of metal, bellows 82 allows higher operating temperatures, higher pressure differentials across the bellows, and will handle a broader range of process gasses. In one embodiment of the invention, metal bellows 82 will withstand temperatures up to 300° F. and allow maximum operating differential pressures of up to 300 psi. The burst pressure of bellows 82 is 1500 psi. Bellows 82 includes two plies 93, 95 which decreases the flexibility of the bellows but increases the maximum operating pressure differential.

The stroke of stem 70 is determined by the amount of travel required by plug 50 away from valve seat 22 to allow adequate clearance to permit a satisfactory flow of process gas from chamber 16 of cylinder 14. In one embodiment of the invention, bellows 82 is designed to allow for a stem travel between 0 and 1½". A stroke of 5–6" of stem 70 is considered a maximum range of travel for a typical bellows. The length of the stroke can be increased by adding to the number of convolutions 90 in the bellows 82. In one embodiment of the invention, bellows 82 is designed for a life of 1,000 cycles, i.e., three cycles per week over a five-year period. It is anticipated that at the end of the five years, bellows member 80 will be replaced.

The internal diameter of bellows 82 must be sufficient to provide adequate clearance for the reciprocation of stem 70. Therefore, the outside diameter of stem 70 determines the inside diameter of bellows 82. It is preferred that bellows 82 have a minimum outside diameter since the differential pressure between the process gas and atmosphere is applied to the cross-sectional area of bellows 82.

The retainer end fitting 84 includes an annular base 92 disposed in an annular counterbore 94 within flange 42 of retainer-plug seal adapter 40. Retainer end fitting 84 also includes a reduced diameter portion 96 slidingly received within the bore 39 of adapter 40. End 83 of bellows 82 is affixed to the terminal end 98 of retainer end fitting 84. Retainer end fitting 84 also includes an annular groove 100 housing a static seal 102 for sealing engagement with the face 104 of second annular portion 38 of bonnet 30. Static seal 102 may be metallic, organic (as for example, graphite), polymeric, or elastomeric. Retainer end fitting 84 includes a bore 108 aligned with bore 64 of bonnet 30 for receiving stem 70.

Plug end fitting 88 is received in a counterbore 103 on the inner side 105 of base 52 of plug 50. End 86 of bellows 82 is affixed to annular flange 114 of plug end fitting 88. Plug end fitting 88 includes a bore 110 therethrough for receiving the inner threaded end 72 of stem 70. An inwardly facing frustoconical sealing surface 111 is provided at the inner end of bore 110 to sealingly engage radius 112 of stem 70. Upon the threaded engagement of fasteners 68, 69 on end 72, radius 112 bears against sealing surface 111 to form a metal-to-metal seal 116. There is a line contact between radius 112 and surface 111.

A back-up elastomeric static seal 115 may be disposed around inner end 72 of stem 70 adjacent radius 112. Upon inserting end 72 into bore 110 of plug end fitting 88, seal 115 becomes disposed at the inner end of bore 110 of plug end fitting 88. Upon the threaded engagement of fasteners 68, 69, back-up static seal 115 is compressed to sealingly engage stem 70 and plug end fitting 88. Seal 115 may be a standard O-ring. Seal 115 is a back-up to metal-to-metal seal 116. Although it is only necessary that metal-to-metal seal 116 be provided, the metal-to-metal seal 116 and elastomeric seal 115 may be used in combination.

Referring again to FIG. 1, a lateral vent hole 121 is provided in bonnet 30 to communicate with enlarged diameter portion 64 to provide communication with the interior of bellows member 80. A pressure indicator, such as a pressure switch 123, is attached to bonnet 30 at the exit of vent hole 121 to monitor the interior pressure of bellows member 80. The pressure switch of this embodiment includes a spring-loaded pin which during normal operation is unexposed. Should leakage occur at bellows member 80, the internal pressure of bellows member 80 will increase overcoming the spring-loaded pressure switch and expose the pin. The spring sets the amount of pressure required to actuate the pressure switch. Also, enlarged diameter bore 64 provides additional volume for the gas within bellows member 80 so that the gas can pass into this additional volume during compression upon the downstroke of stem 70.

Bonnet 30 further includes a second flange 117 having a counterbore 118 coaxial with clearance bore 62 and forming an annular sealing surface 122. A packing nut 120 having an annular flange 124 is received within counterbore 122 and includes an axial guide bore 126. A pair of seal grooves 131 are provided on the outer periphery of packing nut 120 to house static seals 132, 134 which sealingly engage the annular wall of counterbore 122. A pressure test port 136 is provided through flange 117 and extends to an annular groove 138 around the periphery of packing nut 120 to pressure test static seals 132, 134. Packing nut 120 is attached to flange 117 by fasteners 142.

Packing nut 120 includes an inner counterbore 127 housing back-up dynamic seal 128 and an annular groove 129 housing back-up dynamic seal 130. Back-up dynamic seals 128, 130 are adapted to sealingly engage stem 70 passing through bore 126 of packing nut 120. The slipper seal used for seal 58 between plug 50 and adapter 40 may be used as the back-up dynamic seals 128, 130. Such seals have been used in the past as the primary dynamic seal for sealing the bonnet with the reciprocating stem. However, slipper seals tend to fail quicker where the diameter of the seal is small as compared to the length of the stroke of the moving member, such as sealing between the stem and bonnet. Seal 58 between adapter 40 and plug 50 has a larger diameter and plug 50 has a short stroke as compared to the smaller diameter of seals 128, 130 and the length of the stroke of stem 70. The nature of the material of Teflon causes it to be susceptible to scratching. Further, Teflon is subject to cold flow. Under stress, the tendency of Teflon to cold flow increases. Over time as forces are applied to Teflon, it tends to cold flow allowing leakage to occur. Such leakage is not of concern between the plug and adapter because the gas merely leaks downstream into the chamber 20 inside the compressor 12 itself. However, leakage between the stem 70 and bonnet 30 will pass to the atmosphere.

A stop member 135 is disposed in an annular groove around stem 70 adjacent the face 137 of packing nut 120. Stop 135 may be in the form of a retaining ring which will engage the face 137 of packing nut 120 to limit the stroke of stem 70 toward the loaded position as shown in FIG. 1. Stop member 135 prevents the over travel of stem 70 so as to over extend bellows 82.

Unloader 10 is a pneumatically-actuated system and includes a cylindrical sleeve 140 mounted to the terminal end of flange 117 of bonnet 30 by an end cover 150 bolted to flange 117 by fasteners 144. A cylindrical plate 146 is mounted within the cylinder formed by sleeve 140 and affixed to the other end 148 of stem 70. End 148 includes a threaded reduced diameter portion forming a shoulder 152 abutting the inner side of plate 146 as stem 70 passes through aperture 154 in plate 146. Plate 146 includes a large counterbore 156 for receiving a threaded fastener 158 to affix plate 146 to end 148 of stem 70. Plate 146 includes an inner annular groove 161 in aperture 154 for receiving static seal 162 which sealingly engages stem 70. Plate 146 also includes an outer annular groove 163 housing energized seal 164 which sealingly engage the interior wall 141 of sleeve 140.

Unloader 10 further includes an unloader spring 160 disposed between the end face 166 of flange 117 and the inner face of plate 146. An annular groove 168 is provided in the inner face of plate 146 to receive one end of unloader spring 160. The other end of unloader spring 160 is disposed around the annular flange 124 of packing nut 120.

End 148 of stem 70 extends through a bore 172 in end cover 150. End cover 150 includes a counterbore 174 for receiving fastener 158 upon the reciprocation of stem 70 to the unloaded position. End cover 150 further includes an annular groove 173 in bore 172 for housing static seal 170 which sealingly engages stem 70.

Bellows member 80 provides an expansible/contractible means 82 which eliminates the need for dynamic seals between the stem 70 and bonnet 30 for preventing the process gas in the compressor cylinder 14 from escaping to the atmosphere. Dynamic seals are seals which must seal against a sliding surface such as upon the reciprocation of stem 70 within bonnet 30. Static seals 102 and 116 are the only required seals for sealing between the bonnet 30 and stem 70. Secondary or back-up dynamic seals 128, 130 and secondary static seals 132, 134 are typically elastomeric and polymeric, although back-up dynamic seals 128, 130 may be slipper seals like seal 58. These seals provide a redundant sealing system to ensure that the process gas is prevented from escaping to the atmosphere.

The convolutions 90 of bellows 80 form an expandable and contractible collar or joint around one end of stem 70 to allow stem 70 to reciprocate within bonnet 30 through the expansion and contraction of the convolutions 90, thus allowing ends 83, 86 to be fixed to fittings 84, 88, respectively, so that only static seals such as seal 102 between retainer end fitting 84 and the face 104 of bonnet 30 and metal-to-metal seal 116 between end 72 of stem 70 and plug end fitting 88 need be used.

In the embodiment shown in FIG. 1, the fixed end 83 of metal bellows 82 is fixedly attached to bonnet 30 through the use of retainer-plug seal adapter 84 and threaded fasteners 46. Static seal 102 is interposed between bonnet 30 and the fixed end 83 of bellows 82 thereby preventing the escape of process gas in the compressor 12 to the atmosphere through the interface between bonnet 30 and metal bellows 82. The free removable end 86 of bellows 82 is fixedly attached to moveable stem 70 through the use of plug end fitting 88 attached to stem 70. As shown in FIG. 2, threaded fasteners 68, 69, with plug 50 interposed between the threaded fasteners 68, 69 and the moveable end 86 of bellows 82, is used to draw radius 112 of stem 70 into contact with the frustoconical seal surface 111 of plug end fitting 88 with sufficient force to produce a metal-to-metal static seal 116 and seal the interface between the moveable end 86 of bellows 82 and stem 70. A back-up static seal 115 may be interposed between the fitting 88 and stem 70 to assist primary static seal 116 in preventing gas in the compressor cylinder 14 from escaping through the interface between the fitting 88 and stem 70. In this configuration, bellows 82 and static seals 102, 116 provide a high integrity sealing system preventing the gas in the compressor cylinder 14 from escaping to the atmosphere.

In operation, the unloader piston pressure, $P_1$, in chamber 176 of the actuator is of sufficient magnitude to overcome the force of unloader spring 160 and the force produced by the compressor cylinder pressure, $P_2$, in chamber 16 acting on bellows member 80 thus causing unloader plug 50 to remain in sealing contact with seat 22 in the central throughbore of the reciprocating compressor valve 18. With the unloader in this position, the compressor 12 is "loaded" as shown in FIG. 1. When the magnitude of the unloader piston pressure $P_1$ in chamber 176 is reduced to a sufficiently low value, usually zero pounds per square inch gauge, the force of the unloader spring 160, with or without the force produced by the compressor cylinder pressure $P_2$ in chamber 16 acting on bellows member 80, thereby lifts the unloader plug 50 off of seat 22 in the central throughbore in the reciprocating compressor valve 18. When the unloader 10 is in this position, the compressor is "unloaded" as shown in FIG. 2. While a pneumatic actuator is depicted, any controllable mechanism which imparts reciprocating motion to stem 70 can be used to operate the unloader.

Figure 3:
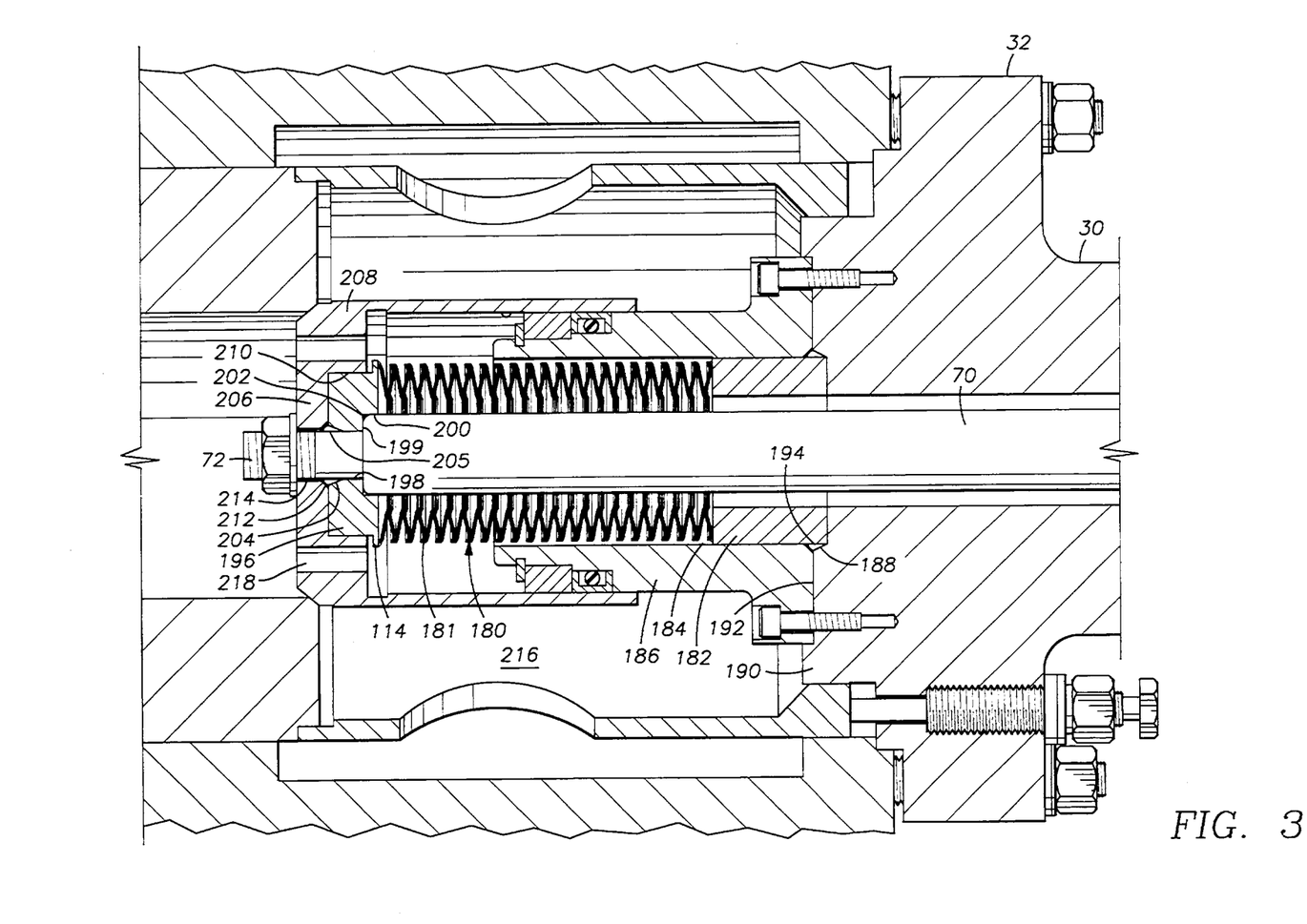
FIG. 3 is a cross-sectional side elevational view of an alternative embodiment of the bellows member shown in FIGS. 1 and 2.

Referring now to FIG. 3, there is shown an alternative embodiment of bellows member 80. In this embodiment, the static seals 102, 116 of the preferred embodiment shown in FIG. 1 are eliminated and a bellows member 180 provides a high integrity, solid metal barrier to prevent the gas in compressor cylinder 14 from escaping through the unloader 10 to the atmosphere.

Bellows member 180 includes a retainer end fitting 182 which is slidingly received within a cylindrical bore 184 of retainer-plug seal adapter 186 and a counterbore 188 in the face 192 of bonnet 190. Retainer end fitting 182 is affixed within counterbore 188 such as by welding or brazing at 194. This forms a solid metal barrier to gas attempting to pass between bellows member 180 and bonnet 190 and eliminates using an elastomeric seal.

Bellows member 180 includes at its other end a plug end fitting 196 having an annular flange 114 to which the metal bellows 181 is welded. Plug end fitting 196 includes a bore 198 for receiving inner end 72 of stem 70. Plug end fitting 196 includes a counterbore 200 for receiving the major diameter of stem 70. The annular shoulder 202 formed by counterbore 200 may be conical to matingly engage the radius 112 of stem 70 for purposes of aligning stem 70 within plug end fitting 196. Since the conical sealing surface 111 and radius 112 only serve to center stem 70 within plug end fitting 196 at the time of welding, these mating frustoconical surfaces may be eliminated and flat paralleled engaging surfaces used for abutting stem 70 against the shoulder 199 of fitting 196 if proper alignment can be achieved. Should counterbore 200 be sufficient to align stem 70 within bore 198, shoulder 202 may be perpendicular to the axis of stem 70. A 45° conical shoulder 204 is cut around the exit of bore 198 for welding at 205 the inner end 72 of stem 70 to plug end fitting 196.

The interior side of base 206 of plug 208 includes a counterbore 210 for receiving plug end fitting 196. A relief 212 is cut on the inner side of plug 208 adjacent aperture 214 in plug 208 receiving inner end 72 of stem 70. Relief 212 receives any weld between stem 70 and fitting 196 which extends beyond fitting 196 so that fitting 196 will be completely disposed within counterbore 210 and allowed to seat on fitting 196 upon makeup of plug 208 on fitting 196. Plug 208 is then affixed to the inner end 72 of stem 70 by fasteners 68, 69.

The welding of stem 70 to plug end fitting 196 provides a solid metal-to-metal barrier to prevent the escape of process gas between stem 70 and bellows member 180. Since fitting 196 is welded to stem 70, no static seals are necessary and thus in this embodiment, metal-to-metal seal 116 and back-up elastomeric seal 115 of the preferred embodiment are eliminated. Since in this embodiment there is shown a balanced plug unloader, there is no concern that process gas may pass between stem 70 and plug 208 since process gas is allowed to pass into cavity 216 due to drilled holes 218.

In this embodiment of the invention, the retainer end fitting 182 of bellows member 180 is permanently joined to and becomes an integral part of bonnet 190 through a welded or brazed joint at 194. The plug end fitting 196 at the other end of bellows member 180 is permanently joined to and becomes an integral part of stem 70 through a welded or brazed joint at 205. In this configuration, the welded or brazed joint 194 which causes the fixed end 182 of bellows member 180 to become an integral part of bonnet 190 and the welded or brazed joint 205 which causes the free or moveable end of bellows member 180 to become an integral part of stem 70, permits bellows member 180 to provide a solid metal, high integrity sealing system preventing gas in the compressor cylinder chamber 16 from escaping through the unloader 10 to the atmosphere.

Figure 4:
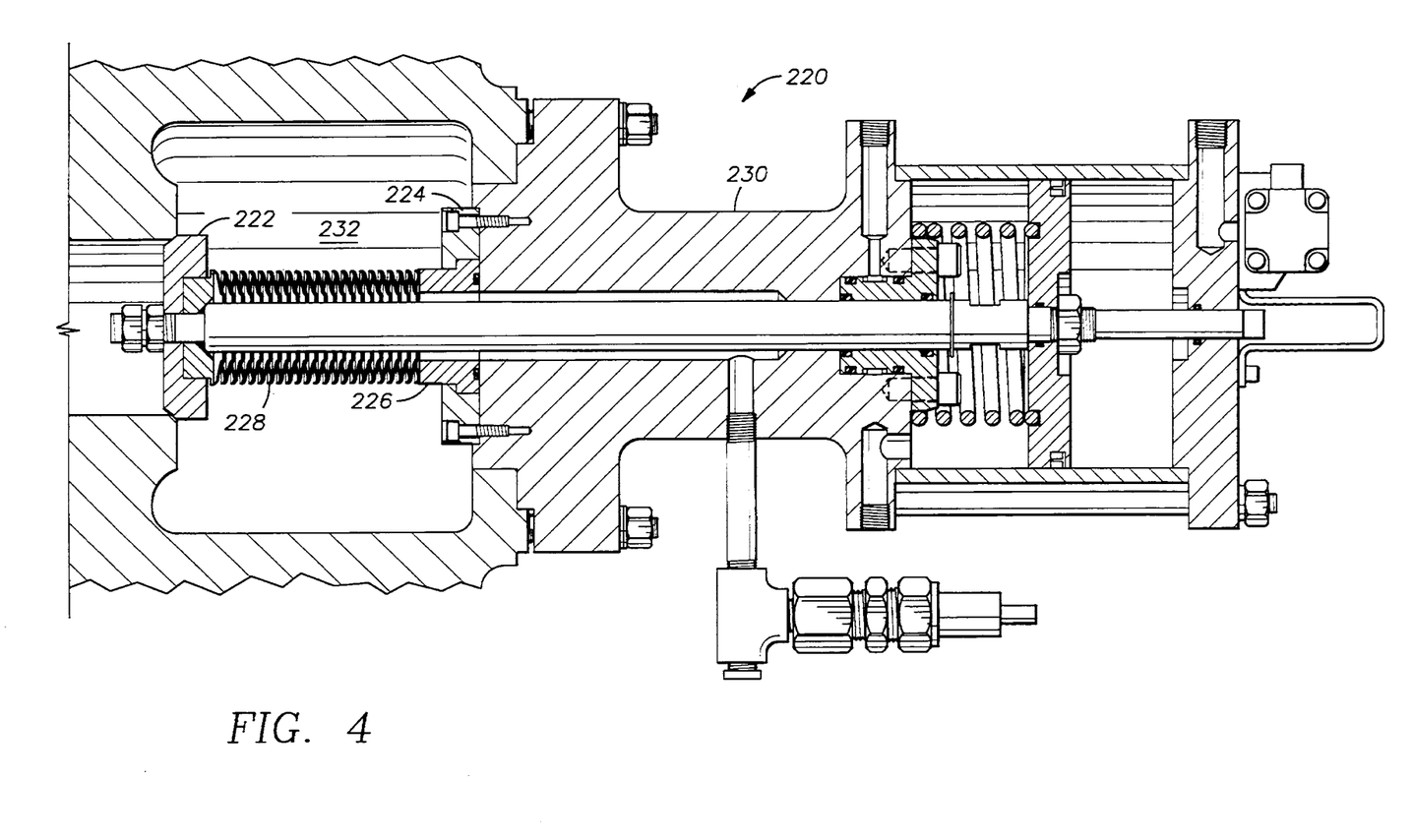
FIG. 4 is a cross-sectional side elevational view of an unbalanced solid plug-type pocket unloader in the loaded position.
Figure 5:
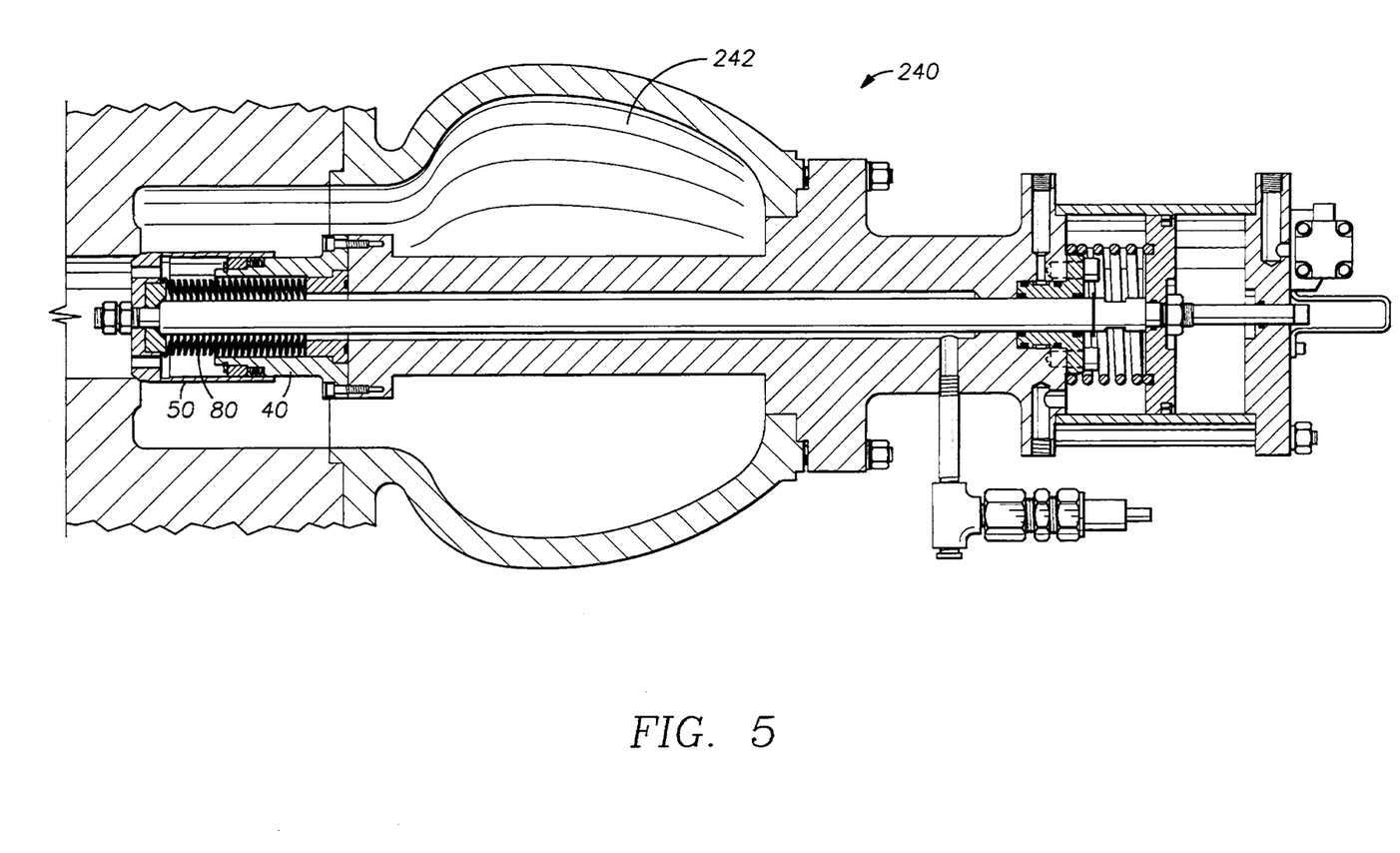
FIG. 5 is a cross-sectional side elevational view of a balanced plug-type volume unloader in the loaded position.

The unloader of FIGS. 1–3 is a balanced plug-type valve unloader. Such unloaders may be used with suction valves on the reciprocating compressor 12. However, the present invention is not limited in its application to balanced plug-type valve unloaders. As shown in FIG. 4, the bellows member of the present invention may be utilized in an unbalanced, solid plug-type pocket unloader, as shown in FIG. 5, in a balanced, plug-type volume unloader and as shown in FIG. 6, in an unbalanced, solid plug-type valve unloader.

The unbalanced, solid plug-type pocket unloader 220 shown in FIG. 4 includes a solid plug 222, as distinguished from plug 50 shown in FIG. 1 with drilled holes 54. Note that in a solid plug-type unloader, plug 222 does not include a cylindrical body and no adapter is required. A flange 224 may be used to affix the retainer end fitting 226 of bellows member 228 on bonnet 230.

The solid plug-type pocket unloader 220 of FIG. 4 may be used at the head end of a cylinder on a reciprocating compressor 12. Unloader 220 includes a clearance volume chamber 232 to allow increased volume upon compression of the piston within the cylinder of the reciprocating compressor 12 when operating in the "unloaded" condition. Although unloader 220 is shown to be pneumatically actuated, it also may be actuated using alternate means.

Figure 6:
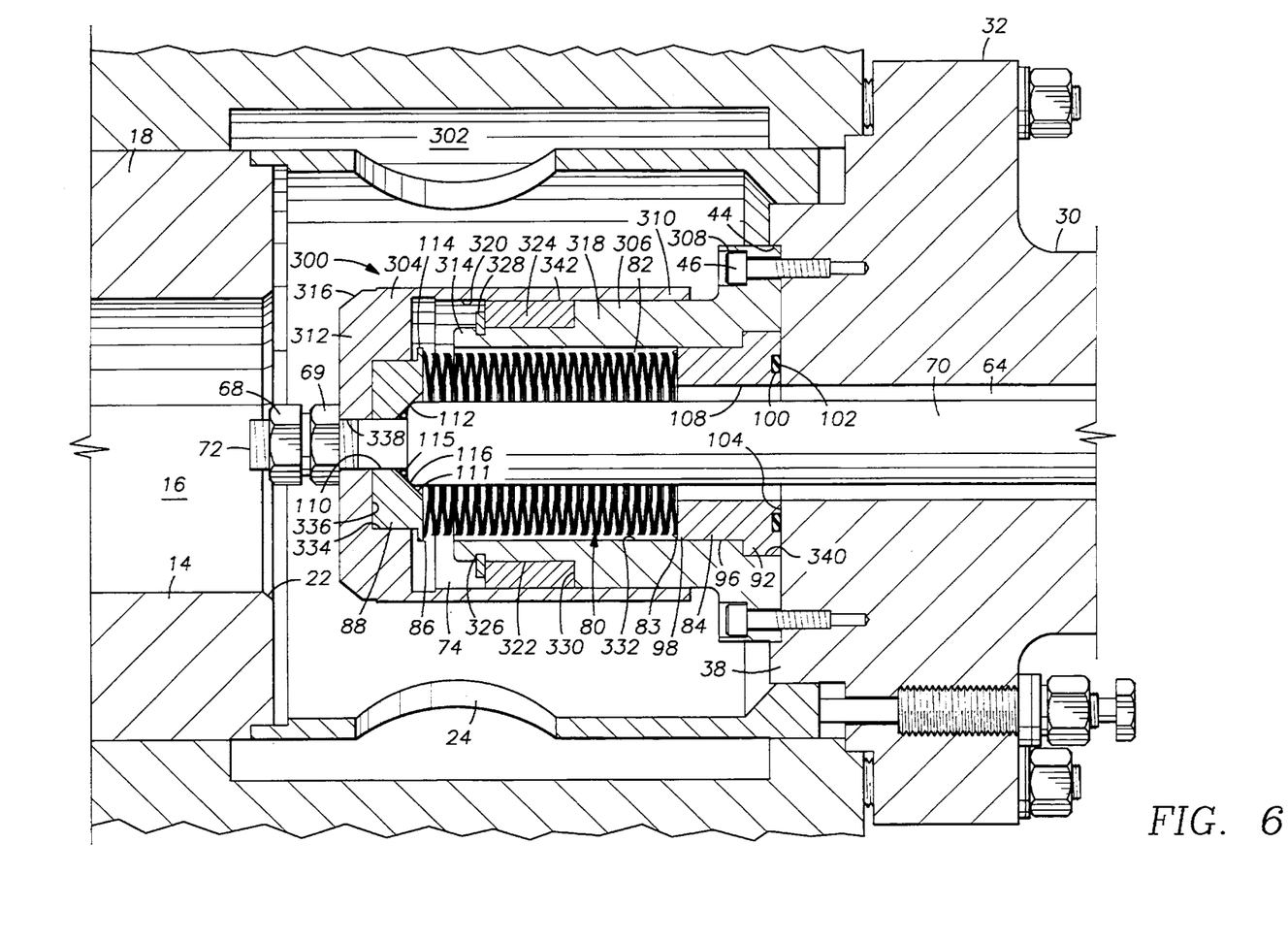
FIG. 6 is an enlarged cross-sectional side elevational view of another embodiment of the unbalanced solid plug-type pocket unloader in the unloaded position.

Referring now to FIG. 6, there is shown another embodiment of an unbalanced, solid plug-type valve unloader 300. The unbalanced unloader 300 is a modified construction of the balanced unloader shown in FIGS. 1–3. To avoid repetitive description, where the elements and features of the unbalanced loader 300 are common to those of the balanced unloader 10 shown in FIGS. 1–3, the same numerals have been used. In particular, it should be appreciated that the bonnet 30 and the pneumatic actuator shown in FIG. 1 may also be used in conjunction with the unbalanced unloader 300. Although unloader 300 is shown to be pneumatically actuated, it may also be actuated using alternate means.

The solid plug-type valve unloader 300 of FIG. 6 may be used with suction valves on a reciprocating compressor 12. Unbalanced unloader 300 includes a generally cylindrical chamber 302 disposed above cylinder 14 and compression chamber 16 within the reciprocating compressor 12.

Unbalanced unloader 300 includes a plug 304 reciprocally mounted on a retainer-plug seal adapter 306. Adapter 306 includes a base flange 308 received within central counterbore 44 and is affixed to bonnet 30 by fasteners 46. Plug 304 has a generally cylindrical body or skirt 310 with a closed end or base 312. Since unloader 300 is unbalanced, no holes are provided through closed end 312 for the passage of process gas from compression chamber 16 into cavity 74. The cylindrical skirt 310 of plug 304 forms a bore which receives the free end 314 of retainer-plug seal adapter 306. Plug 304 includes a sealing face 316 which sealingly engages valve seat 22 in the loaded position.

Retainer 306 includes an outer annular wall 318 which is slidingly received within the inner annular wall 320 of the cylindrical skirt 310 of plug 304. Retainer 306 includes a reduced diameter portion 322 for housing a bearing ring 324.

A retaining ring groove 326 is provided adjacent end 314 of retainer 306 for receiving a retaining ring 328.

Bearing ring 324 is received in reduced diameter portion 322 and bears against the annular shoulder 330 created by the difference in diameters between reduced diameter portion 322 and outer wall 318 and is maintained in position by retaining ring 328. Bearing ring 324 is made of a bearing material and provides an annular bearing wall or surface 342 against the inner annular wall 320 of the cylindrical skirt 3 10 of plug 304. The cylindrical skirt 310 engages the outer bearing surface of bearing ring 324. It should be appreciated that with the appropriate choice of materials, bearing ring 324 may be eliminated and the outer cylindrical wall 318 of retainer 306 extend to the terminal end 3 14 thereby eliminating reduced diameter portion 322. Upon so extending outer wall 318, outer wall 318 would then serve as an annular bearing surface against the inner annular wall 320 of plug 304.

The cylindrical skin 310 slidingly engaging bearing ring 324 serves as a guide for the reciprocation of plug 304 by stem 70. The sliding engagement of inner cylindrical wall 320 with outer cylindrical wall 342 provides a sleeve beating during reciprocation of stem 70.

Unloader 300 further includes bellows member 80 having an expandable and contractible means 82 with static seals on end fittings 84, 88 for sealingly engaging stem 70 and bonnet 30. The expandable and contractible means 82 is mounted within cylindrical cavity 74 formed by plug 304 and adapter 306. The inner diameter of bellows 82 must be sufficient to provide adequate clearance for the reciprocation of stem 70. Therefore, the outside diameter of stem 70 determines the inside diameter of bellow 82. Further, the outside diameter of bellows 82 is received within bore 332 of adapter 306 and must allow for the expansion and contraction of bellows 82 during which time the outer diameter of bellows 82 increases and decreases.

The reduced diameter portion 96 of retainer end fitting 84 is slidingly received within the bore 332 of adapter 306. Fitting 84 also includes a flange 92 disposed within a counterbore 340 in the end of adapter 306.

Plug end fitting 88 is received in a counterbore 334 on the inner side 336 of closed end 312 of plug 304. The inner threaded end 72 of stem 70 passes through bore 110 in plug end fitting 88 and through aligned bore 338 in plug end 312. Threaded fasteners 68, 69 affix plug 304 to the inner end 72 of stem 70. Upon the threaded engagement of fasteners 68, 69 on end 72, plug 304 is fixed to expandable and contractible means 82.

The unbalanced unloader 300 has advantages over the unbalanced unloader 220 shown in FIG. 4. The extending cylindrical skirt 310 of plug 304 slidingly receives bearing ring 324 so as to insulate the bellows 82 from the pressure variations or pulses within chamber 302 when operating in either the loaded or unloaded positions. As can be seen in FIG. 4, the bellows member 228 is exposed to the pressure variations within chamber 232.

Although no seals are provided between the inner annular wall 320 of plug 304 and the outer annular wall 342 of bearing ring 324, only a small amount of gas is able to flow by a capillary-type action from chamber 302 into cavity 74. As can be appreciated, a pressure differential is applied across the cross-sectional area of bellows 82 by the pressure of the gas in annular cavity 74 and the pressure of the atmosphere in bore 64 between bonnet 30 and stem 70. Thus, the extending skin 310 dampens out the pressure oscillations in chamber 302 preventing bellows 82 from being exposed to the full pressure energy of the gas in chamber 302. Bellows 82 is only exposed to a small pressure variation with the largest pressure being seen in the loaded position. By protecting the bellows 82 from the pressure pulsations and oscillations in chamber 302, the operating life of bellows 82 is substantially extended. Otherwise, the pressure oscillations within chamber 302 cause the bellows 82 to fail prematurely.

Referring now to FIG. 5 there is shown a balanced, plug-type volume unloader 240 providing a volume clearance chamber 242 mounted on the cylinder of a reciprocating compressor 12 to allow the compressor cylinder gas to expand into the volume chamber 242 when operating in the "unloaded" condition.

While a preferred embodiment of the invention has been shown and described, modifications thereof can be made by one skilled in the art without departing from the spirit of the invention.

We claim:

1. A balanced unloader for a reciprocating compressor having a cylinder, comprising:

a bonnet for mounting on the compressor and having a bore therethrough;

a stem reciprocably mounted within said bore;

an expandable and contractible bellows member surrounding one end of said stem, said member being attached to said stem and said bonnet;

a plug mounted on said end portion of said stem such that actuation of the stem causes said plug to seat on one end of the cylinder, said plug having at least one aperture for communicating pressure within the cylinder to said member;

a first static seal sealingly engaging said bonnet and said member and a second static seal sealingly engaging said stem and said member such that a pressure differential proportional to pressure in the cylinder exists across said member;

said member expanding and contracting upon the reciprocation of said stem within said bore whereby said first and second static seals each sealingly engage surfaces that are stationary with respect to each other.

2. The unloader of claim 1 wherein said bellows is made of metal.

3. The unloader of claim 1 wherein said member includes a first fitting on one end of said bellows for attachment to said bonnet and a second fitting on another end of said bellows for attachment to said stem.

4. The unloader of claim 1 wherein said member is made of a flexible material which permits the member to expand and contract.

5. The unloader of claim 4 wherein said material includes convolutions.

6. A balanced unloader for a reciprocating gas compressor having a cylinder pressure, comprising:

a bonnet for mounting on the compressor and having a bore therethrough;

a stem reciprocably mounted within said bore;

an expandable and contractible member surrounding an end portion of said stem, said end portion being attached to said member and said bonnet being attached to said member;

a plug mounted on said end portion of said stem and having at least one aperture therethrough communicating pressure within the cylinder to said member;

said member being welded to said plug and said member being welded to said bonnet such that a pressure differential proportional to the cylinder pressure exists across said member;

said member expanding and contracting upon reciprocation of said stem within said bore whereby the welding of said member to said bonnet and said stem forms solid barriers to prevent the passage of gas.

7. An apparatus for sealing between an unloader bonnet mounted on a reciprocating compressor and a stem reciprocably disposed within a bore of the bonnet comprising:

a plug having a cylindrical portion for mounting on an end of the stem;

a first member disposed within said cylindrical portion and having a first bore them through for receiving the end of the stem;

a cylindrical member for mounting on the unloader bonnet said cylindrical member and cylindrical portion in telescoping relationship forming a expandable chamber;

a second member having a second bore therethrough for receiving the stem and adapted for mounting on the bonnet;

a cylindrical bellows disposed within said chamber surrounding a portion of the stem and having one end affixed to said first member and another end affixed to said second member, said bellows being made of a metal and includes expandable and contractible convolutions, each convolution formed from a pair of diaphragms having at least two plys and being circumferentially welded together along their inside and outside edges;

a first weld for preventing the passage of gas between said first member and the stem and a second weld for preventing the passage of gas between said second member and the bonnet.

8. A sealing system for a plug-type unloader, comprising:

a bonnet having a bore therethrough;

a stem reciprocably mounted within said bore;

an adapter mounted on one end of said bonnet and having a plug reciprocably mounted on said adapter;

seal means disposed on said adapter for sealingly engaging said plug;

a bellows member disposed within said adapter and plug and having a first end attached to said bonnet;

said stem passing through said bellows member and attached to said plug and a second end of said bellows member;

a first static seal sealingly engaging said first end and said bonnet and a second static seal sealingly engaging said second end and said stem.

9. The sealing system of claim 8 further including back-up dynamic seals sealingly engaging said stem and said bonnet.

10. The sealing system of claim 8 wherein said seal means includes a slipper seal.

11. A plug-type unloader for a reciprocating compressor, comprising:

a bonnet having a bore therethrough;

a cylindrical adapter mounted on one end of said bonnet;

a cylindrical plug slidingly receiving said adapter to form a cylindrical chamber;

a cylindrical bellows member disposed within said cylindrical chamber and having a cylindrical aperture therethrough;

an actuator mounted on another end of said bonnet;

a stem reciprocably mounted in said bore having a first end affixed to said actuator and a second end affixed to said plug, said stem passing through said cylindrical aperture and through a hole in said cylindrical plug;

said bellows member having a first base affixed to said one end of said bonnet and a second base affixed to said plug;

said bellows member having an expandable and collapsible body allowing said bellows member to expand and contract upon the reciprocation of said stem within said bore by said actuator.

12. The unloader of claim 11 wherein said first base is welded to said bonnet and said second base is welded to said stem.

13. The unloader of claim 11 further including a first static seal between said first base and said bonnet and a second static seal between said second base and said stem.

14. The unloader of claim 13 wherein said second static seal is a metal-to-metal seal.

15. The unloader of claim 14 wherein said second static seal further includes an elastomeric seal.

16. The unloader of claim 11 wherein said stem includes a stop limiting stem travel to the expandability of said bellows member.

17. The unloader of claim 11 further including a gas leak path between said cylindrical adapter and said cylindrical plug.

18. The unloader of claim 11 wherein said cylindrical adapter includes a bearing surface for bearing engagement with said cylindrical plug.

19. The unloader of claim 11 wherein said cylindrical adapter includes a guide surface for guiding said cylindrical plug.

* * * * *